(12) United States Patent
Kaiser

(10) Patent No.: US 9,314,725 B2
(45) Date of Patent: Apr. 19, 2016

(54) FILTER ELEMENT

(75) Inventor: Sven A. Kaiser, Winnenden (DE)

(73) Assignee: Mahle International GmbH (DE)

( * ) Notice: Subject to any disclaimer, the term of this patent is extended or adjusted under 35 U.S.C. 154(b) by 158 days.

(21) Appl. No.: 14/126,847

(22) PCT Filed: Jun. 14, 2012

(86) PCT No.: PCT/EP2012/061351
§ 371 (c)(1),
(2), (4) Date: Jun. 2, 2014

(87) PCT Pub. No.: WO2012/172017
PCT Pub. Date: Dec. 20, 2012

(65) Prior Publication Data
US 2014/0260136 A1    Sep. 18, 2014

(30) Foreign Application Priority Data

Jun. 17, 2011 (DE) .......................... 10 2011 077 712

(51) Int. Cl.
*B01D 46/24* (2006.01)
*B01D 46/00* (2006.01)
*B01D 46/52* (2006.01)
*F02M 35/024* (2006.01)

(52) U.S. Cl.
CPC .......... *B01D 46/2411* (2013.01); *B01D 46/005* (2013.01); *B01D 46/2414* (2013.01); *B01D 46/521* (2013.01); *F02M 35/02483* (2013.01); *B01D 2275/206* (2013.01); *B01D 2279/60* (2013.01)

(58) Field of Classification Search
CPC ............. B01D 46/005; B01D 46/2411; B01D 46/2414; B01D 46/521; B01D 2275/206; B01D 2279/60; F02M 35/02483
See application file for complete search history.

(56) References Cited

U.S. PATENT DOCUMENTS 3,740,931 A   6/1973  Nowicki
6,852,217 B2  2/2005  Jokschas et al.

FOREIGN PATENT DOCUMENTS

EP        1163944 A1     12/2001
WO    WO-02/053258 A1    7/2002

*Primary Examiner* — Robert Clemente
(74) *Attorney, Agent, or Firm* — Fishman Stewart PLLC

(57) ABSTRACT

A filter element of a filter device for filtering a fluid may include a ring-shaped filter body from a filter material. The filter body may enclose an interior space in the circumferential direction. A main port may be fluidically connected to the interior space and an auxiliary port may also be fluidically connected to the interior space. The filter body may include a duct that extends axially and is radially open. The auxiliary port may be arranged in a region of the duct.

19 Claims, 7 Drawing Sheets

FILTER ELEMENT

CROSS-REFERENCE TO RELATED APPLICATIONS

This application claims priority to German Patent Application 10 2011 077 712.1 filed Jun. 17, 2011, and International Patent Application PCT/EP2012/061351 filed on Jun. 14, 2012, both of which are hereby incorporated by reference in their entirety.

TECHNICAL FIELD

The present invention relates to a filter element for a filter device for filtering a fluid.

BACKGROUND

Filter devices are used, for example, in motor vehicles. This can concern in particular air filter devices. Used therein is a filter element configured as an air filter.

For different applications in vehicles, so-called secondary air may be required. For example, an exhaust system can be equipped with an additional burner in order to heat up exhaust gas purification components during a warm-up phase to their operating temperature. Expediently, purified air is used as secondary air. In order to affect the operation of the internal combustion engine as little as possible, it is advantageous to extract the secondary air upstream of an air mass flow sensor, thus in particular already directly at the air filter device. In order to still be able to position the air mass flow sensor as close as possible to the filter element, comparatively high expenditure is required for implementing the secondary air port.

SUMMARY

The present invention is concerned with the problem of providing an improved or at least alternative embodiment for a filter element of the aforementioned type, which is in particular characterized in that in the case of a use as an air filter, implementing a secondary air port is simplified.

This problem is solved according to the invention by the subject matter of the independent claim. Advantageous embodiments are subject matter of the dependent claims.

The invention is based on the general idea, for a filter element having a ring-shaped filter body and being equipped with a main port that is fluidically connected to an interior space enclosed by the filter body, to equip the filter body with a duct that extends axially in the ring contour of the filter body, and to arrange in the region of said duct an auxiliary port that is also fluidically connected to the interior space. With the duct, a region is created at the filter body, which region is suitable for arranging the auxiliary port, thereby providing a comparatively large clearance space for positioning the auxiliary port. The design freedom for implementing, for example, a secondary air port on the filter device equipped with the filter element is thus improved. The duct is radially open on one side and interrupts in the circumferential direction the filter body's ring contour formed by the annularly arranged filter material. Through this, the duct is integrated in the filter body without departing from the ring contour of the filter body. Thus, the filter element can be installed instead of a conventional filter element so as to provide a possibility for a secondary air port.

Through the auxiliary port it is possible to extract purified gas parallel to the main port, thus preferably purified air from the interior space, whereby it is further possible to arrange an air mass flow sensor very close to the main port. The secondary air is extracted via the auxiliary port.

Expediently, the auxiliary port can be fluidically connected through the duct to the interior space. In this case, the duct is advantageously radially open towards the inside, thus towards the interior space, and feeds the purified gas to the auxiliary port.

In another embodiment, at least one end plate can be provided that axially borders the filter body. Advantageously, the main port and the auxiliary port can then be formed on this one end plate, thus on the same end plate. In such an embodiment, the main port can be formed, for example, by a central opening in the end plate. The end plate is then configured as a centrally open end plate. Another end plate, which axially borders the filter body opposite to the open end plate, is then advantageously configured as a closed end plate. With regard to a longitudinal centre axis of the ring-shaped filter body, the auxiliary port is formed eccentrically on the open end plate.

If the duct is radially open towards the inside, thus towards the interior space, the auxiliary port can advantageously be formed on an end plate that axially borders the filter body, and can be axially fed through the end plate and fluidically connected to the duct. Through this, the auxiliary port and the main port can be oriented axially and, for example, can be configured as plug connectors. The auxiliary port and the main port can be formed on end plates that face away from each other. Also, the main port and the auxiliary port can be formed on the same end plate.

According to another embodiment, the auxiliary port can be axially fed between longitudinal ends of the duct through a duct bottom bordering the interior space and can be radially fluidically connected to the interior space. Hereby, the entire axial length of the duct is available for the desired positioning of the auxiliary port.

According to a refinement, the auxiliary port can comprise a radially oriented port end that is remote from the duct bottom. Hereby, the auxiliary port can be configured in a particularly simple manner as a straight nozzle.

As an alternative, the auxiliary port can have an axially oriented port end that is located remote from the duct bottom. In this case, the auxiliary port is configured as an elbow fitting.

According to an alternative embodiment, the duct can be radially open towards the outside, thus towards the surroundings. This makes it possible, for example, to arrange the auxiliary port radially recessed in the duct. Advantageously, the port end can be axially fed through a cut-out that is formed in an end plate axially bordering the filter body. Thus, an axially oriented connection is also implemented here for the auxiliary port, wherein, at the same time, the auxiliary port is radially connected to the interior space and therefore is axially spaced apart from the end plate when communicating with the interior space. This can be an advantageous for reducing interactions with an air mass flow sensor that is positioned close to the main port.

In particular, the end plate provided with the cut-out can be configured as an open end plate and the main port can be positioned centrally. In this case, the opposing second end plate is configured as a closed end plate.

If the auxiliary port and the main port are formed on different end plates, the auxiliary port has a maximum distance from the main port, whereby negative influences on the air mass flow measurement are minimized.

In a special embodiment, the duct can be formed directly by the filter material. For example, the filter material can be formed by a folded web material. The end folds can rest planarly against each other and can be oriented tangentially with regard to a circle extending about the longitudinal centre axis of the filter body. The end folds connected to each other in this manner can then form a duct bottom of the duct.

In another embodiment, the duct can be formed by a duct body that has a radially open cross-section profile. Hereby, increased dimensional stability is achieved for the duct, which simplifies accommodation and arrangement of the auxiliary port.

For example, the auxiliary port can be fed through the duct body and can be radially fluidically connected to the interior space. Furthermore, the filter material can line the duct body on an inner side facing the interior space, or on an outer side facing away from the interior space. Furthermore, it is possible that the filter material is arranged edge-to-edge with the duct body so that the duct body is arranged in the joint between the circumferential ends of the filter material. Likewise, the end folds of the folded filter material can be fastened spaced apart from each other on the duct body, in particular by snap-fitting, gluing or welding. In this case, the duct body forms an interruption of the filter material in the circumferential direction.

According to another advantageous embodiment, the duct body can be integrally formed on an internal frame on which the filter material is radially supported on the inside. Additionally or alternatively, the duct body can be integrally formed on an end plate of the filter element, which end plate axially borders the filter body.

Due to the integral construction, producing the filter element including the duct is simplified.

In another embodiment, the auxiliary port can be formed as a connection nozzle that is integrally formed on the duct body or can be configured as a separate component that is then mounted to the filter material.

According to another advantageous embodiment, the filter material is a folded web material, wherein then the duct is advantageously arranged in the region of end folds of the filter material.

The duct preferably has a cross-section profile that is U-shaped, C-shaped, trapezoidal or V-shaped. In the case of a U-shaped duct cross-section, the duct has two plane side surfaces that extend parallel to each other. Due to the defined position of the side surfaces, the filter medium can be fastened in a particularly simple manner on a duct body or on the adjacent regions of the filter medium. This fastening process can be carried out manually and also automated. The parallel sides can be connected by a plane side or a curved side. When using a curved side, the outer curvature of the entire filter element can be formed at the same time in order to form a continuous circumference in this manner.

In the case of the V-shaped or trapezoidal formation of the duct cross-section, the plane side surfaces extend inclined to each other, wherein the enclosed angle preferably is an acute angle. The open side is preferably that side that has the greater distance between the side surfaces. When the open side communicates with the filter interior, it is easier for the air to flow into the duct. If the open side is oriented towards the outside, a nozzle extending in the duct can be mounted more easily.

In an alternative configuration, the open side is that side that has the smaller distance. Thus, the duct widens with increasing depth. This in particular advantageous if a nozzle is snap-fitted during assembly, and complicated fastening of the nozzle in the duct can therefore be avoided. It is particularly advantageous here if the duct has reversibly deformable regions which spring back into their initial position. These deformable regions can be provided in the side surfaces or in the closed connection side. This embodiment is also advantageous in the case of a C-shaped duct.

Further important features and advantages of the invention arise from the sub-claims, from the drawings, and from the associated description of the figures based on the drawings.

It is to be understood that the above-mentioned features and the features still to be explained hereinafter are usable not only in the respective mentioned combination, but also in other combinations or alone, without departing from the context of the present invention.

Preferred exemplary embodiments of the invention are illustrated in the drawings and are explained in more detail in the following description, wherein identical reference numbers refer to identical, or similar, or functionally identical components.

BRIEF DESCRIPTION OF THE DRAWINGS

In the figures, schematically.

DETAILED DESCRIPTION

Figure 1:
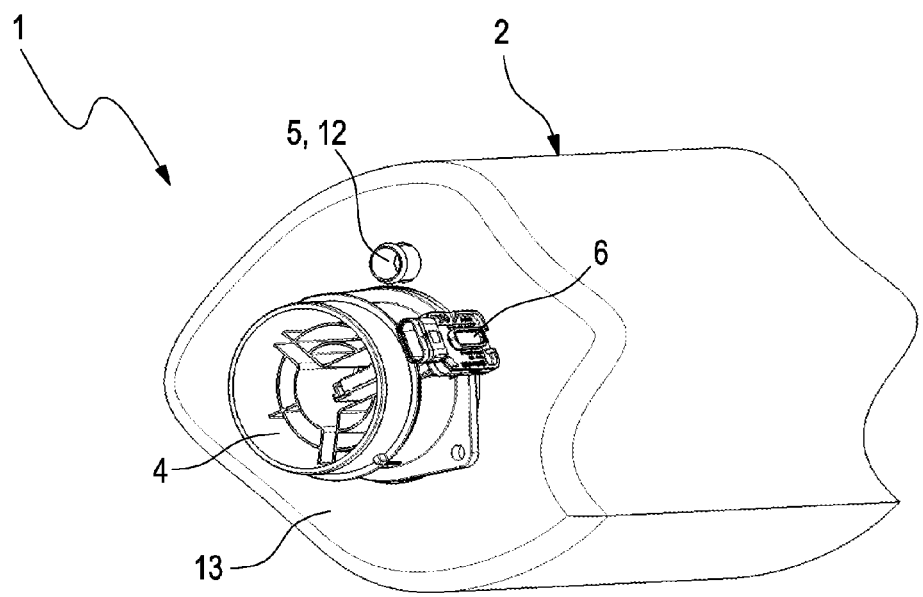
FIG. 1 shows an isometric view of a filter device with a housing and a sensor system.
Figure 2:
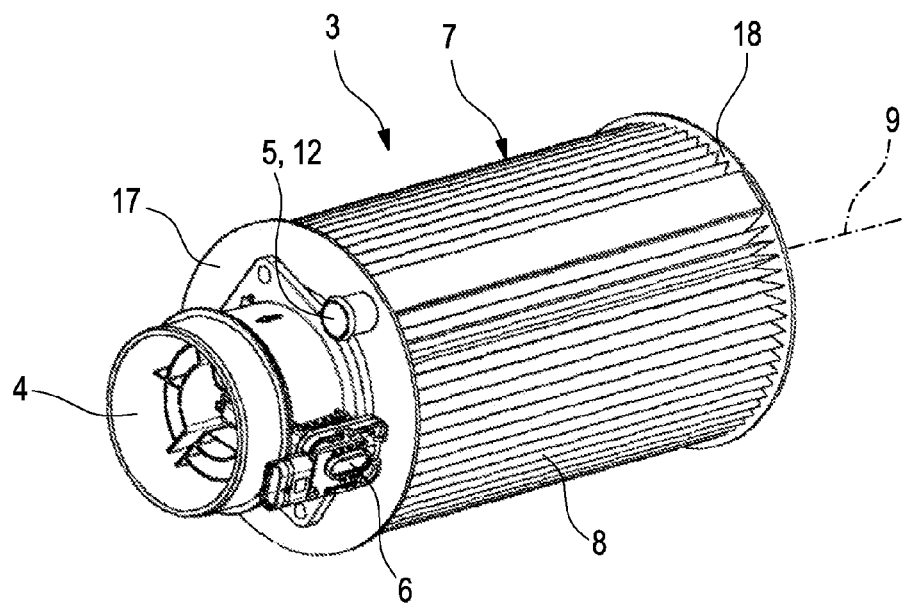
FIG. 2 shows an isometric view of a filter element with the sensor system, but without the housing of the filter device.

According to FIG. 1, a filter device 1 for filtering a fluid comprises a housing 2 in which, according to FIG. 2, a filter element 3 is arranged. In a preferred application, the filter device 1 is an air filter device that is suitable for installation in a fresh air system of an internal combustion engine and is preferably used in a motor vehicle. Advantageously, a primary port 4 for discharging primary air that is fed to the combustion chambers of the internal combustion chamber can be arranged on the housing 2. Moreover, the housing 2 has a secondary port 5 through which secondary air can be extracted so as to be able to feed secondary air to an auxiliary aggregate of the internal combustion engine or to the vehicle equipped therewith. For example, the secondary air is fed to a burner that can be used in an exhaust system of the internal combustion engine for heating up the exhaust gas treatment components.

The filter device 1 is additionally equipped here with a sensor system 6, by means of which the air volume or air mass exiting the primary port 4 can be measured. The measured air volume is an important parameter for controlling the internal combustion engine. As can be seen, the sensor system 6 is arranged here directly at the primary port 4. It is therefore important to extract the secondary air such that is has no significant influence on the measured value of the sensor system 6.

According to the FIGS. 2 to 20, the filter element 3 has a ring-shaped filter body 7 from a filter material 8. Thus, the filter body 7 has a longitudinal centre axis 9. With regard to this longitudinal centre axis 9, the filter body 7 encloses an interior space 10 in the circumferential direction. The filter element 7 is equipped with a main port 11 that is fluidically connected to the interior space 10. When the filter element 7 is inserted in the housing 2, this main port 11 is fluidically connected to the primary port 4. For example, the primary port 4 has an axial nozzle which, when assembling the filter element 7, extends axially into the main port 11.

Furthermore, the filter element 7 is equipped with an auxiliary port 12 which likewise is fluidically connected to the interior space 10. Accordingly, the main port 11 and the auxiliary port 12 are connected in parallel to the interior space 10. In the assembled state, the auxiliary port 12 is fluidically connected to the secondary port 5. In the example shown in FIG. 1, the auxiliary port 12 itself forms the secondary port 5, for which reason the auxiliary port 12 is configured to be nozzle-shaped and is fed through an end wall 13 of the housing 2.

The filter body 7 is additionally equipped with a duct 14 that extends axially, thus parallel to the longitudinal centre axis 9 of the filter body 7. The duct 14 is radially open on one side, thus transverse to the longitudinal centre axis 9. Furthermore, the duct 14 is integrated in the filter body 7 in such a manner that it interrupts, in the circumferential direction, the ring contour of the filter body 7 formed by the annularly arranged filter material 8. The auxiliary port 12 is now arranged in the region of this duct 14. In particular, the auxiliary port 12 thus is fluidically connected to the interior space 10 via the duct 14. In the case of a duct 14 that is radially open towards the outside, as it is represented, for example, in the FIGS. 3 to 5, 9 to 11 and 15 to 17, this can be implemented in that a nozzle 15 of the auxiliary port 12 is positioned in the duct 14 and is fed through a duct bottom 16 and is fluidically connected to the interior space 10. In the case of a duct 14 that radially open towards the inside, as illustrated, e.g., in the FIGS. 2, 6 to 8, 12 to 14 and 18 to 20, the fluidic connection of the auxiliary port 12 to the interior space 10 can be implemented through the duct 14 in such a manner that the duct 14 itself, which is radially open towards the inside, is directly fluidically connected to the interior space 10, and that the auxiliary port 12 is fluidically connected in a suitable manner to the duct 14. This can be done, for example, axially as shown, e.g., in the FIGS. 2 and 6 to 8, or radially as shown, e.g., in the FIGS. 12 to 14 and 18 to 20.

Advantageously, the filter element 3 has two end plates 17, 18 which are also designated hereinafter as first end plate 17 and second end plate 18, and which axially border the filter body 7 at opposite axial end sides. For example, for this purpose, the filter material 8 is glued or welded or plasticized together with the end plates 17, 18. In the exemplary embodiments shown here, the main port 11 is formed in each case on the first end plate 17. For this, the first end plate 17 is advantageously configured as an open end plate that has a central passage opening 19 that forms the main port 11. The open first end plate 17 can also be designated as ring plate 17. In these embodiments, the second end plate 18 can be configured as a closed end plate that has no central opening that is connected to the interior space 10.

In the embodiments shown in the FIGS. 2 and 6 to 8, the auxiliary port 12 is formed on the same end plate as the main port 11, namely on the first end plate 17. In this case, the auxiliary port 12 is arranged eccentrically, with regard to the longitudinal centre axis 9, on the first end plate 17. In these embodiments of the FIGS. 2 and 6 to 8, the duct 14 is radially open towards the inside, thus towards the interior space 10, and the auxiliary port 12 is formed on the first end plate 17 in such a manner that it is fed axially through the first end plate 17 and is fluidically connected to the duct 14.

Figure 3:
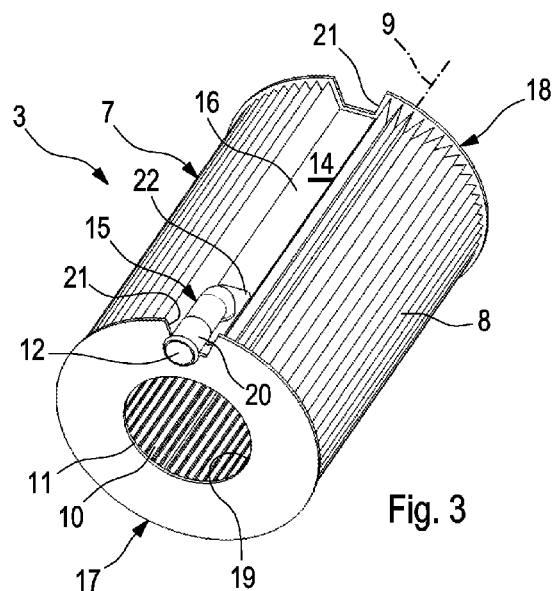
FIG. 3 shows an isometric view of the filter element of another embodiment.
Figure 4:
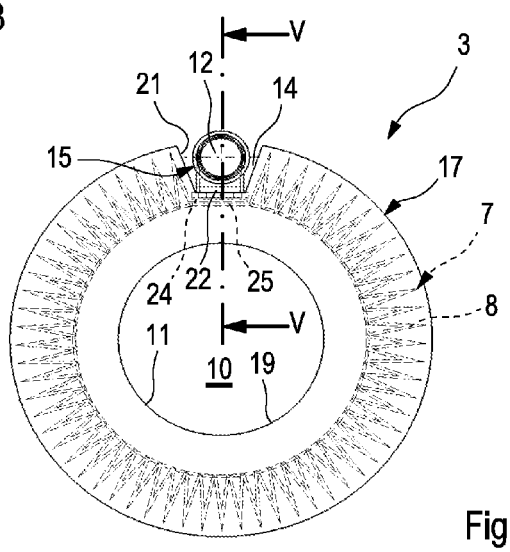
FIG. 4 shows an axial view of the filter element from FIG. 3.
Figure 5:
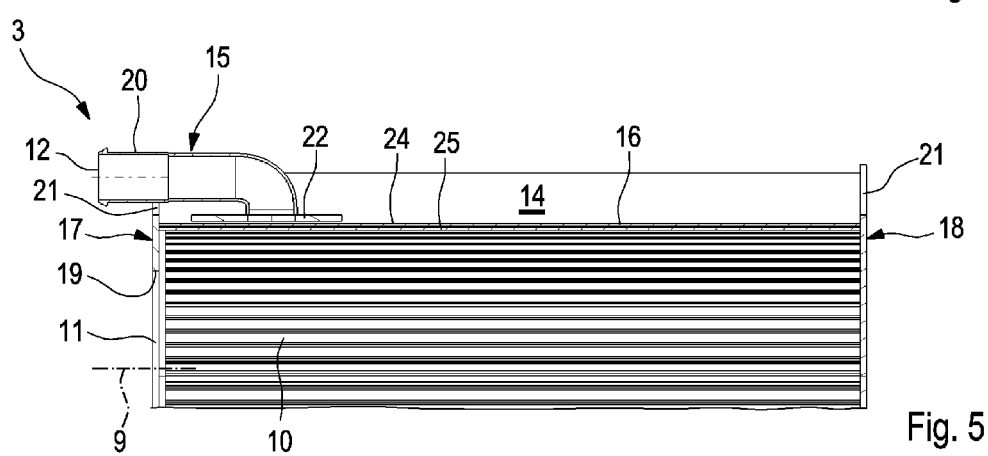
FIG. 5 shows half a longitudinal section of the filter element from FIG. 3.
Figure 6:
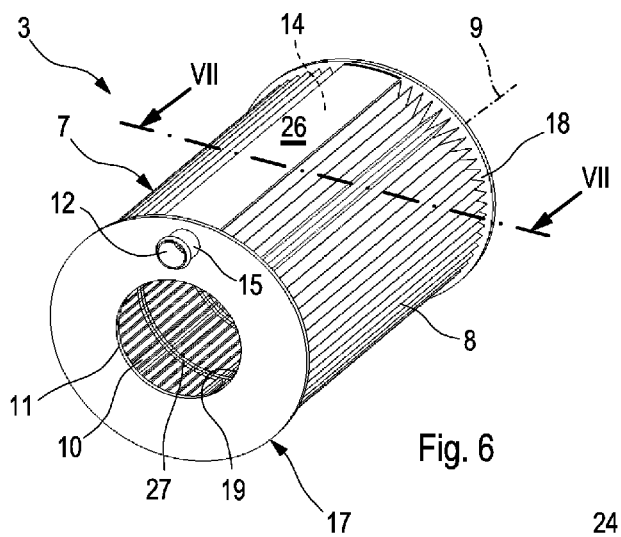
FIG. 6 shows an isometric view of a filter element of a further embodiment.
Figure 7:
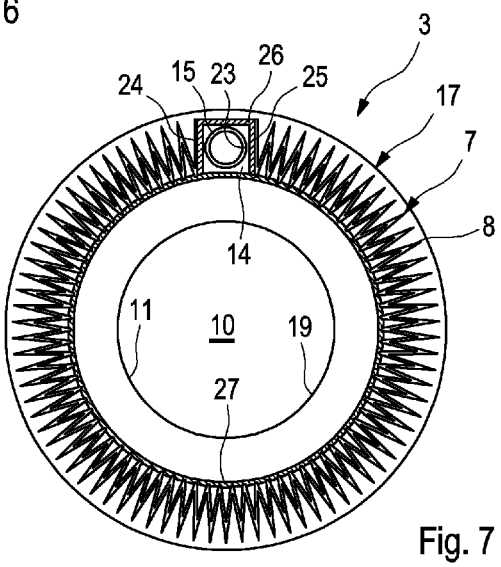
FIG. 7 shows a cross-section of the filter element from FIG. 6.
Figure 8:
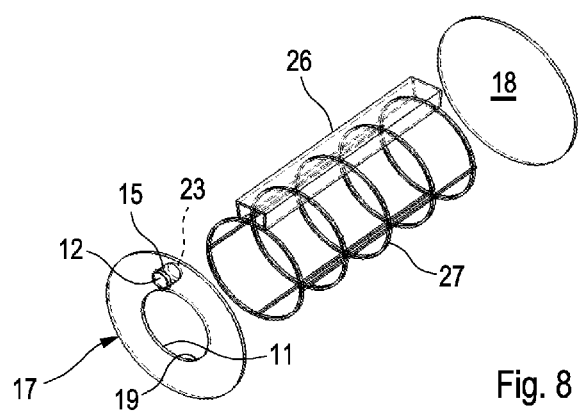
FIG. 8 shows an exploded isometric view of a plurality of components of the filter element from FIG. 6.
Figure 9:
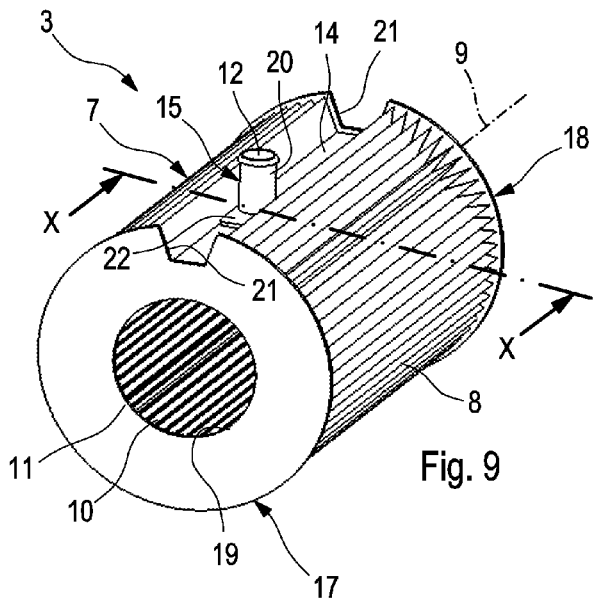
FIG. 9 shows an isometric view of a filter element of a further embodiment.
Figure 10:
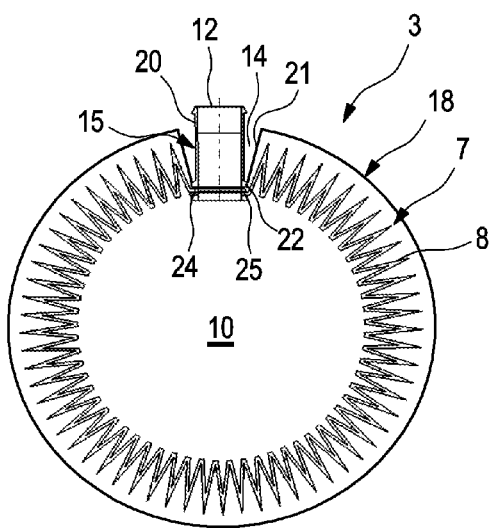
FIG. 10 shows a cross-section of the filter element from FIG. 9.
Figure 11:
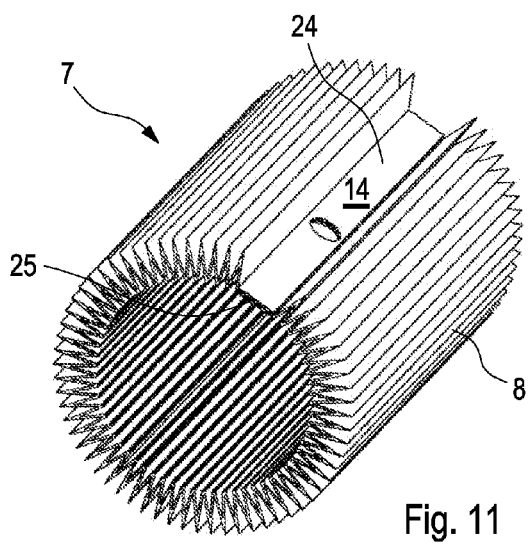
FIG. 11 shows an isometric view of a filter body of the filter element from FIG. 9.
Figure 12:
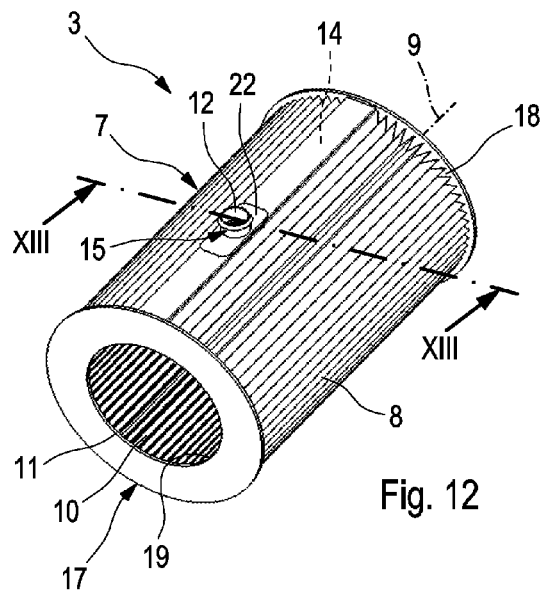
FIG. 12 shows an isometric view of a filter element of another embodiment.
Figure 13:
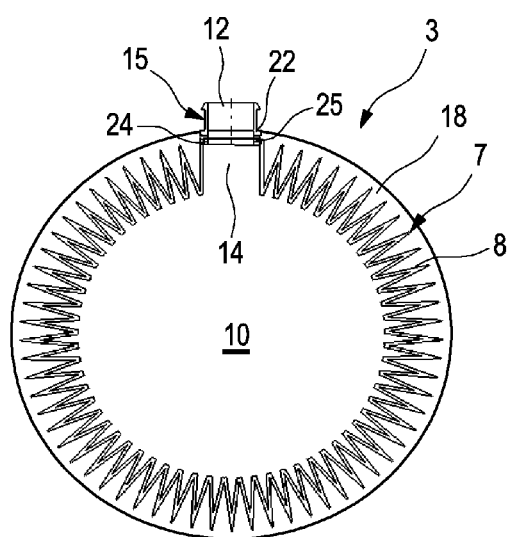
FIG. 13 shows a cross-section of the filter element from FIG. 12.
Figure 14:
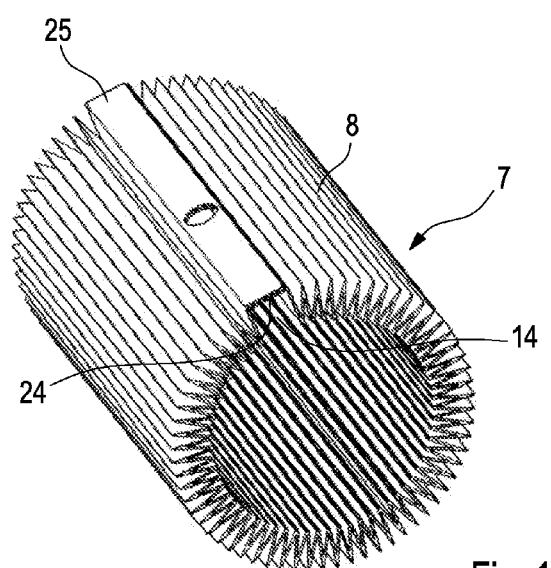
FIG. 14 shows an isometric view of a filter body of the filter element from FIG. 12.
Figure 15:
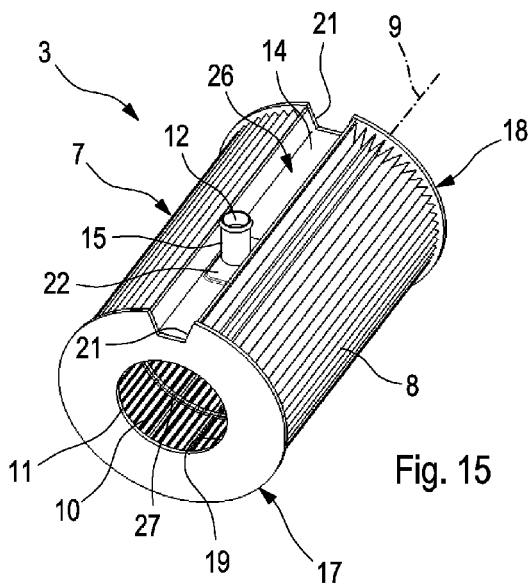
FIG. 15 shows an isometric view of a filter element of a further embodiment.

In the embodiments of the FIGS. 3 to 5 and 9 to 20, the auxiliary port 12 is fed axially between axial longitudinal ends of the duct 14 through the duct bottom 16 and is radially fluidically connected to the interior space 10. For implementing the auxiliary port 12, the aforementioned nozzle 15 is used here. This nozzle 15 can have a port end 20 which is remote from the duct bottom 16 and which, in the embodiment shown in the FIGS. 3 to 5, is oriented axially and is axially fed through a cut-out 21 formed in the first end plate 17. In this respect, here too, the auxiliary port 12 is arranged in the region of the first end plate 17. It is clear that in another embodiment, the nozzle 15 can be fed with its axially oriented port end 20 through a corresponding cut-out 21 of the second end plate 18 so that the auxiliary port 12 is arranged in the region of the second end plate 18.

In the embodiments of the FIGS. 3 to 20, the nozzle 15 also has a duct end 22 that is arranged at the duct 14 and by means of which the nozzle 15 is fastened to the duct bottom 16 and by means of which the nozzle 15 is fed through the duct bottom 16 and connected to the interior space 10. In contrast to this, in the embodiments shown in the FIGS. 2 and 6 to 8, the nozzle 15 is arranged directly on the first end plate 17 or integrally formed thereon so that the nozzle 15 extends through an eccentric opening 23 formed in the first end plate 17 so as to be connected to the duct 14. It is clear that also in this construction, the auxiliary port 12 can be implemented in a corresponding manner at the second end plate 18.

In the embodiments of the FIGS. 9 to 20, the port end 20 of the nozzle 15 is oriented radially with regard to the longitudinal centre axis 9, as a result of which the nozzle 15 has a comparatively simple structure. In these cases, the nozzle 15 is configured as a straight nozzle 15. In contrast to this, the nozzle of the embodiment according to the FIGS. 3 to 5 is configured as an angled nozzle 15.

According to the FIGS. 2 to 14, the duct 14 can be formed directly from the filter material 8. For example, the filter material 8 is a folded web material which, for production-related reasons, has two end folds 24, 25 in the circumferential direction, which have to be fastened to each other in order to close the filter body 7 in the circumferential direction. Advantageously, for this purpose, the two end folds 24, 25 can be aligned tangentially with regard to a circle, the centre of which lies on the longitudinal centre axis 9, and can rest planarly against each other and can be fastened to each other. Hereby, the tangentially aligned end folds 24, 25, which are fastened to each other, form the duct bottom 16.

In the embodiments of the FIGS. 15 to 20, a duct body 26 is provided for implementing the duct 14, which duct body is a separate component with regard to the filter material 8. The duct body 26 forms the duct 14 and accordingly has a radially open cross-section profile, which substantially can be a U-profile. The auxiliary port 12 can now be fed through the duct body 26 and can be radially fluidically connected to the interior space 10.

The filter material 8, in particular in the case that it is a folded web material, can line the duct body 26 on an inner side facing the interior space 10, or can enclose the duct body on an outer side facing away from the interior space 10. In other words, if the duct 14 is open towards the inside, the duct body 26 can stiffen a receiving chute, that is already preformed by the filter material 8, from the inside, or can stiffen it from the outside if the duct 14 is open towards the outside, by inserting the duct body 26 into the channel-shaped receiving chute that is preformed by the filter material 8.

Alternatively, the duct body 26 can also be arranged in the circumferential direction between circumferential ends of the filter material 8 so that the circumferential ends of the filter material 8 do not adjoin each other in the circumferential direction, but adjoin in each case the duct body 26. Advantageously, the filter material 8 is fastened to the duct body 26 in the region of these circumferential ends. In this respect, the duct body 26 forms an interruption of the filter material 8 in the circumferential direction.

Figure 16:
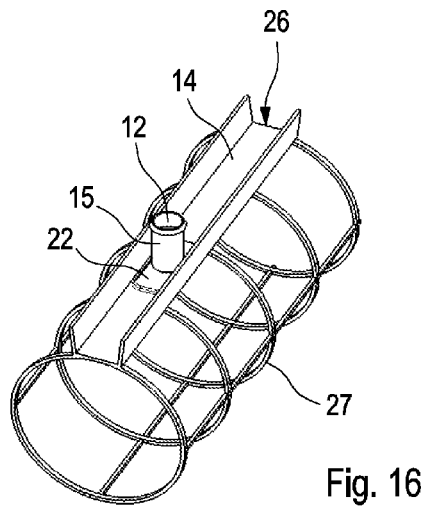
FIG. 16 shows an isometric view of an assembly of the filter element from FIG. 15.
Figure 19:
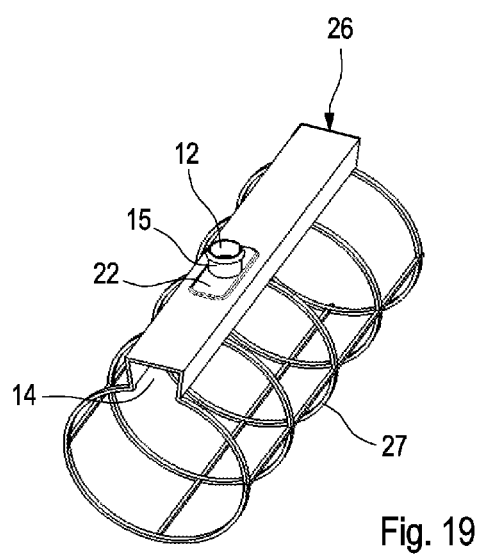
FIG. 19 shows an isometric view of an assembly of the filter element from FIG. 18.

According to the FIGS. 16 and 19, the duct body 26 can be integrally formed on an internal frame 27 of the filter element 3. Such an internal frame 27 enables supporting the filter material 8 or the filter body 7 radially from the inside. The integral construction simplifies the implementation of the duct body 26.

Figure 17:
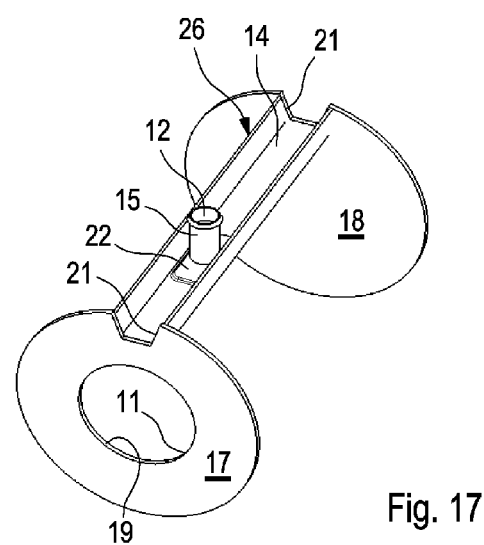
FIG. 17 shows an isometric view of another embodiment of the assembly of the filter element from FIG. 15.
Figure 18:
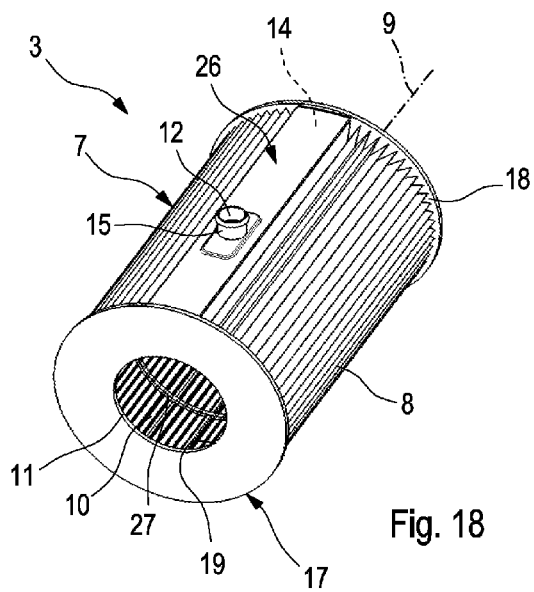
FIG. 18 shows a further isometric view of a filter element of yet another embodiment.
Figure 20:
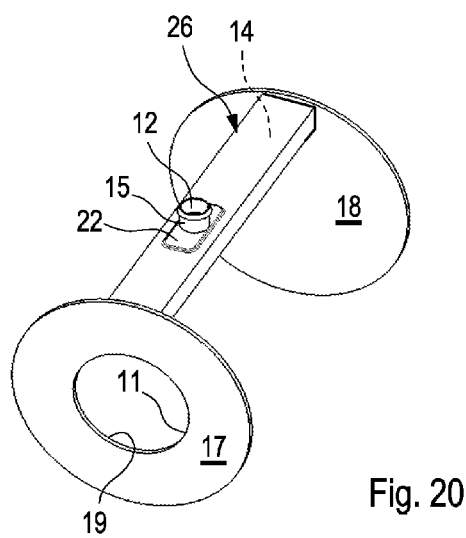
FIG. 20 shows an isometric view of another embodiment of the assembly of the filter element of FIG. 18.

Alternatively, according to the FIGS. 17 and 20, the duct body 26 can also be integrally formed with at least one of the two end plates 17, 18 or—as shown—integrally formed with both end plates 17, 18. Likewise, the duct body 26 can be integrally formed with at least one of the two end plates 17, 18 and with the internal frame 27.

According to a further alternative embodiment, the duct body 26, with regard to the internal frame 27—if there is one—and with regard to the end plates 17, 18, can also be a separate component.

Particularly advantageous is an embodiment in which the auxiliary port 12 or its nozzle 15 is integrally formed on the duct body 26. This simplifies the implementation of the duct body 26 equipped with the auxiliary port 12. In particular, this makes it easier to tightly connect the connection nozzle 15 extending through the duct body 26. It is also possible to configure the nozzle 15 as a separate component with regard to the duct body 26.

The invention claimed is:

1. A filter element of a filter device for filtering a fluid, comprising:
   a ring-shaped filter body from a filter material, said filter body having an axis and enclosing an interior space in a circumferential direction,
   a main port fluidically connected to the interior space, and an auxiliary port fluidically connected to the interior space, wherein the filter body has a duct that extends axially and is radially open, and wherein the duct includes a duct body that has a radially open cross-section profile, wherein the auxiliary port is arranged in a region of the duct.

2. The filter element according to claim 1, wherein the auxiliary port is fluidically connected to the interior space via the duct.

3. The filter element according to claim 1, further comprising at least one end plate axially bordering the filter body, wherein the main port and the auxiliary port are formed on the at least one end plate.

4. The filter element according to claim 1, wherein
   the duct is radially open towards the interior space, and
   the auxiliary port is formed on an end plate that axially borders the filter body, wherein the auxiliary port is axially fed through the end plate to be fluidically connected to the duct.

5. The filter element according to claim 1, wherein the auxiliary port is axially fed between the longitudinal ends of the duct through a duct bottom that borders the interior space such that the auxiliary port is radially fluidically connected to the interior space.

6. The filter element according to claim 5, wherein the auxiliary port has a port end that is remote from the duct bottom and is oriented radially.

7. The filter element according to claim 5, wherein
   the auxiliary port has a port end that is remote from the duct bottom and is oriented axially,
   the duct is radially open towards the outside relative to the interior space, and
   the port end is axially fed through a cut-out that is formed in at least one end plate each of which axially borders the filter body.

8. The filter element according to claim 1, wherein the duct is formed directly by the filter material.

9. The filter element according to claim 1, wherein the auxiliary port is fed through the duct body to be radially fluidically connected to the interior space.

10. The filter element according to claim 1, wherein at least one of:
    the filter material at least one of lines the duct body on an inner side facing towards the interior space and encloses the duct body on an outer side facing away from the interior space, and
    the duct body is arranged in the circumferential direction between circumferential ends of the filter material, wherein the filter material is fastened to the duct body in the circumferential ends.

11. The filter element according to claim 1, wherein the duct body is integrally formed on at least one of an internal frame on which the filter material is supported radially from the inside, and on at least one end plate that axially borders the filter body.

12. The filter element according to claim 1, wherein the duct interrupts in the circumferential direction a contour of the filter body, the contour formed by the annularly arranged filter material.

13. The filter element according to claim 1, wherein the auxiliary port is configured as a nozzle that can be at least one of integrally formed on a duct body and configured as a separate component that is mounted to at least one of the duct body and the filter material.

14. The filter element according to claim 1, wherein the filter material is a folded web material, and the duct is arranged in the end folds of the filter material.

15. The filter element according to claim 3, wherein the duct is radially open towards the interior space and the auxiliary port is formed on the at least one end plate axially bordering the filter body, wherein the auxiliary port is axially fed through the end plate to be fluidically connected to the duct.

16. A filter element of a filter device for filtering a fluid, comprising:
- a ring-shaped filter body composed of a filter material, the filter body having an axis and enclosing an interior space in a circumferential direction, wherein the filter body includes a duct that extends axially and is radially open;
- a main port fluidically connected to the interior space; and
- an auxiliary port fluidically connected to the interior space, wherein the auxiliary port is arranged in a region of the duct; and
- at least one end plate axially bordering the filter body, wherein the main port and the auxiliary port are disposed on the at least one end plate.

17. A filter element of a filter device for filtering a fluid, comprising:
- a ring-shaped filter body composed of a filter material, the filter body having an axis and enclosing an interior space in a circumferential direction, wherein the filter body includes a duct that extends axially and is radially open towards the interior space;
- a main port fluidically connected to the interior space; and
- an auxiliary port fluidically connected to the interior space, wherein the auxiliary port is arranged in a region of the duct; and
- an end plate axially bordering the filter body, wherein the auxiliary port is disposed on the end plate, the auxiliary port being axially fed through the end plate to be fluidically connected to the duct.

18. A filter element of a filter device for filtering a fluid, comprising:
- a ring-shaped filter body composed of a filter material, the filter body having an axis and enclosing an interior space in a circumferential direction, wherein the filter body includes a duct that extends axially and is radially open;
- a main port fluidically connected to the interior space; and
- an auxiliary port fluidically connected to the interior space, wherein the auxiliary port is arranged in a region of the duct; and
- wherein the duct interrupts in the circumferential direction a contour of the filter body, wherein the contour is formed by the annularly arranged filter material.

19. A filter element of a filter device for filtering a fluid, comprising:
- a ring-shaped filter body composed of a filter material, the filter body having an axis and enclosing an interior space in a circumferential direction, wherein the filter body includes a duct that extends axially and is radially open towards the outside relative to the interior space;
- a main port fluidically connected to the interior space; and
- an auxiliary port fluidically connected to the interior space and arranged in a region of the duct, wherein the auxiliary port is axially fed between the longitudinal ends of the duct through a duct bottom that borders the interior space such that the auxiliary port is radially fluidically connected to the interior space;
- wherein the auxiliary port includes a port end that is remote from the duct bottom and is oriented axially, and wherein the port end is axially fed through a cut-out that is formed in an end plate that axially borders the filter body.

\* \* \* \* \*